(12) United States Patent
Costa

(10) Patent No.: US 6,520,524 B1
(45) Date of Patent: Feb. 18, 2003

(54) MOTORCYCLE SUSPENSION COMPONENTS

(76) Inventor: Vincenzo F. Costa, 4671 Los Patos Ave., Huntington Beach, CA (US) 92649

( * ) Notice: Subject to any disclaimer, the term of this patent is extended or adjusted under 35 U.S.C. 154(b) by 0 days.

(21) Appl. No.: 09/868,446
(22) PCT Filed: Dec. 17, 1999
(86) PCT No.: PCT/US99/30173
§ 371 (c)(1), (2), (4) Date: Sep. 7, 2001
(87) PCT Pub. No.: WO00/35686
PCT Pub. Date: Jun. 22, 2000

Related U.S. Application Data
(60) Provisional application No. 60/114,040, filed on Dec. 29, 1998, and provisional application No. 60/112,838, filed on Dec. 18, 1998.

(51) Int. Cl.[7] .............................................. B62K 25/08
(52) U.S. Cl. ..................................................... 280/276
(58) Field of Search ............................... 280/275, 276, 280/277, 279, 283, 284; 180/227

(56) References Cited

U.S. PATENT DOCUMENTS

| | | | | |
|---|---|---|---|---|
| 2,708,112 A | * | 5/1955 | Seddon et al. | |
| 3,984,119 A | | 10/1976 | Okazima | 280/276 |
| 4,334,589 A | | 6/1982 | Asakura et al. | 180/219 |
| 4,511,156 A | | 4/1985 | Offenstadt | 280/276 |
| 4,515,253 A | | 5/1985 | Itoh | 188/314 |
| 4,515,384 A | | 5/1985 | Honma et al. | 280/276 |
| 4,561,669 A | | 12/1985 | Simons | 280/276 |
| 4,579,199 A | | 4/1986 | Nakayama et al. | 188/299 |
| 4,585,086 A | | 4/1986 | Hiramatsu | 180/219 |
| 4,616,810 A | | 10/1986 | Richardson et al. | 267/8 R |
| 4,735,276 A | | 4/1988 | Burton | 180/219 |
| 4,809,828 A | | 3/1989 | Nakazato | 188/322.15 |
| 4,819,773 A | | 4/1989 | Ito et al. | 188/322.15 |
| 4,826,207 A | | 5/1989 | Yoshioka et al. | 280/714 |
| 4,878,558 A | | 11/1989 | Asakura | 180/219 |
| 4,936,424 A | | 6/1990 | Costa | 188/299 |
| 5,009,451 A | | 4/1991 | Hayashi et al. | 280/724 |
| 5,086,866 A | | 2/1992 | Banjo et al. | 180/219 |
| 5,098,120 A | | 3/1992 | Hayashi et al. | 280/710 |
| 5,201,384 A | | 4/1993 | Kiyota et al. | 180/219 |
| 5,249,650 A | | 10/1993 | Tanaka | 188/344 |
| 5,301,973 A | | 4/1994 | Truchinski | 280/276 |
| 5,301,974 A | * | 4/1994 | Knapp | 280/283 |
| 5,332,068 A | | 7/1994 | Richardson et al. | 188/275 |
| 5,348,112 A | | 9/1994 | Vaillancourt | 180/227 |
| 5,460,355 A | | 10/1995 | Danek | 267/221 |
| 5,509,677 A | | 4/1996 | Bradbury | 280/276 |
| 5,511,811 A | * | 4/1996 | Pileggi | 280/276 |
| 5,531,150 A | | 7/1996 | Gegaregian et al. | 89/15 |
| 5,553,836 A | | 9/1996 | Ericson | 267/286 |
| 5,673,878 A | | 10/1997 | Yamate et al. | 248/65 |
| 5,711,514 A | | 1/1998 | Lu | 267/221 |
| 5,732,798 A | | 3/1998 | Toson | 188/18 A |
| 5,823,306 A | | 10/1998 | de Molina | 188/322.15 |
| 5,884,733 A | * | 3/1999 | McAndrews et al. | 188/276 |

* cited by examiner

Primary Examiner—Anne Marie Boehler

(57) ABSTRACT

A motorcycle fork blade (21A or 21B) wherein a spring (50) is longitudinally captured between a leg and a fixture on an elongate member (33) so that the fixture and spring (50) are maintained within a lower tube during a normal range of travel of the blade so as to minimize binding or damage to the spring. Another aspect is a height adjuster featuring a threaded stud accommodated within a bore of a stanchion tube endplug (36) and carrying a fixture for engaging the spring (50). The invention also includes a shock absorber reservoir assembly (220), and a gas-filed bladder (240) on the extension side of a shock absorber (200) to provide volume compensation.

4 Claims, 9 Drawing Sheets

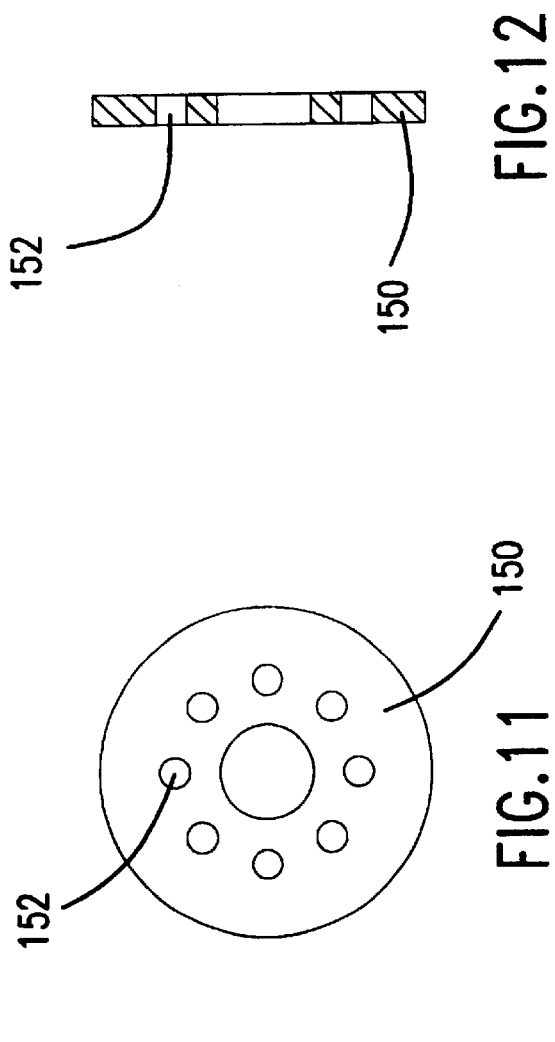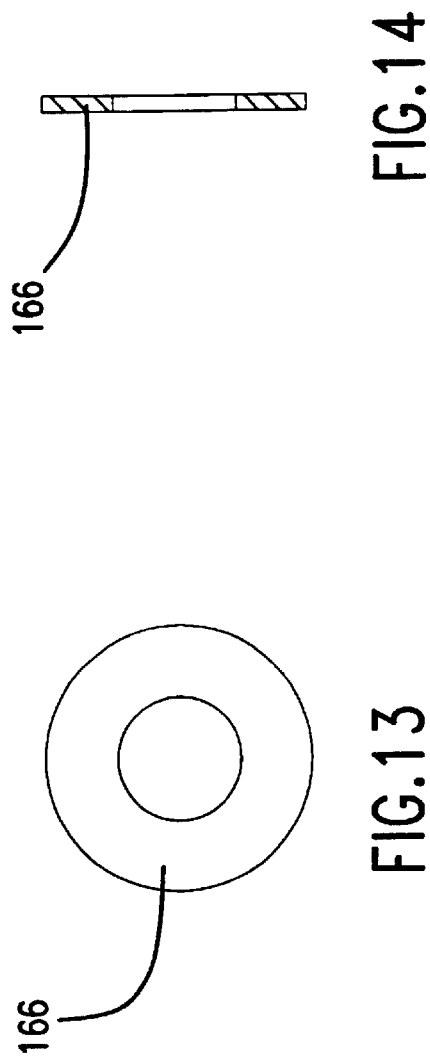

MOTORCYCLE SUSPENSION COMPONENTS

CROSS-REFERENCE TO RELATED APPLICATIONS

This patent application claims priority of commonly owned U.S. patent application Ser. No. 60/112,838 entitled "Motorcycle Suspension" filed Dec. 18, 1998; and Ser. No. 60/114,040 entitled "Motorcycle Suspension Components" filed Dec. 29, 1998. U.S. patent application Ser. Nos. 60/112, 838 and 60/114,040 are incorporated by reference in their entireties herein as if set forth at length.

BACKGROUND OF THE INVENTION (1) Field of the Invention

This invention relates to motorcycles, and more particularly to telescopic motorcycle forks and to reservoirs for height-adjustable motorcycle shock absorbers.

(2) Description of the Related Art

The dominant class of front suspension for motorcycles is the telescopic fork. Each of a left blade and a right blade of the fork includes telescoping members which extend and compress responsive to loads between the motorcycle frame and the front wheel. Each blade includes one or more springs which provide the necessary static compression resistance and hydraulic valving components which provide damping (shock absorption). Many telescoping forks have a height adjustment feature allowing adjustment of the static blade extension for a given static load. Although the art is extremely developed, there remains room for various combinations of enhanced performance and simplified manufacture.

Many shock absorbers (rear or front) include external reservoirs which receive hydraulic fluid from the shock absorber as it is compressed and return such fluid to the shock absorber as it is extended. The reservoirs may be gas-pressurized (such as by introduction of air). When air is introduced to the reservoir, it will tend to drive some of the hydraulic fluid back into the shock absorber thereby extending the shock absorber and increasing static ride height. Withdrawal of air similarly lowers ride height.

Valving of the fluid flow between the reservoir and shock absorber will affect the shock absorption characteristics. A user-adjustable valve or valves may be provided. The size of the reservoir, along with desired access for air introduction and valve adjustment are among factors which render reservoirs difficult to conceal so as to reduce visual clutter.

Although there is a well developed art in shock absorber reservoirs, there remains room to provide a reservoir having various combinations of improved performance, simplified manufacture, and aesthetic appeal.

BRIEF SUMMARY OF THE INVENTION

In one aspect, the invention is directed to a motorcycle fork blade including a leg for engaging a front wheel axle, a lower tube extending upward from the leg and an upper tube telescopically surrounding the lower tube. An upper endplug extension with an upper end portion of the upper tube. An elongate member depends from the endplug. A spring is longitudinally captured between the leg and a fixture on the elongate member so that the fixture and spring are maintained within the lower tube during a normal range of travel of the blade so as to minimize possibility for binding of or damage to the spring.

In another aspect the invention is directed a height adjuster featuring a threaded stud accommodated within a bore of a stanchion tube endplug and carrying a fixture for engaging a main spring of the blade.

In another aspect the invention is directed to a shock absorber reservoir assembly.

In another aspect the invention is directed to use of a gas-filled bladder on the extension side of a shock absorber to provide volume compensation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 11 is a plan view of a valve plate of the reservoir of FIG. 9.

FIG. 12 is a longitudinal cross-sectional view of the plate of FIG. 11, taken along line 12—12.

FIG. 13 is a plan view of a valve washer of the reservoir of FIG. 9.

FIG. 14 is a longitudinal cross-sectional view of the washer of FIG. 12, taken along line 14—14.

Like reference numbers and designations in the various drawings indicate like elements.

DETAILED DESCRIPTION

Figure 1:
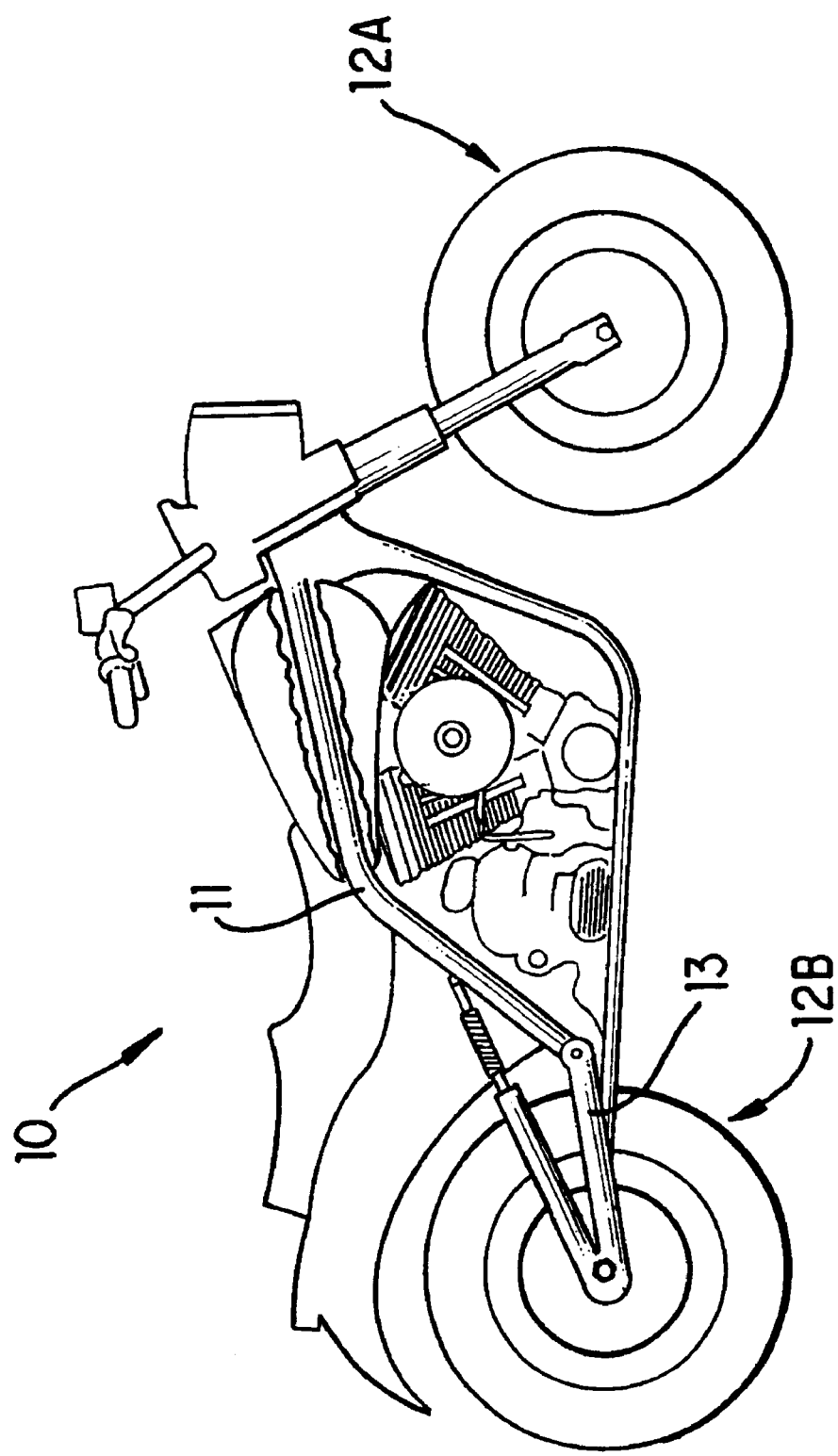
FIG. 1 a semi-schematic view of a motorcycle.
Figure 3:
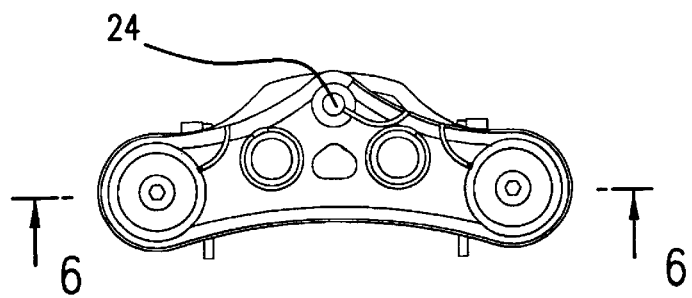
FIGS. 2–5 are front, top, side, and oblique views of a motorcycle fork according to principles of the invention.
Figures 2, 4:
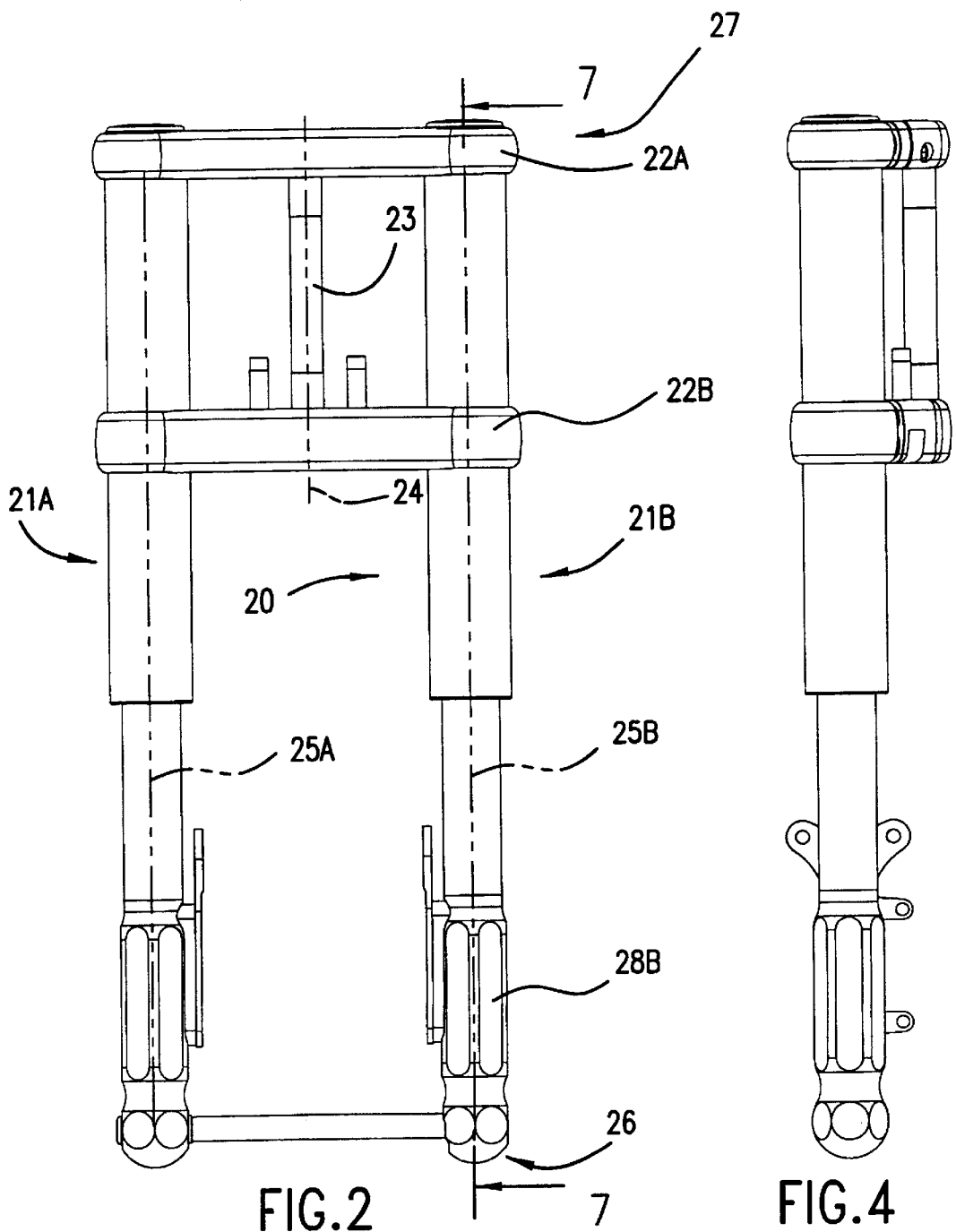
Figure 5:
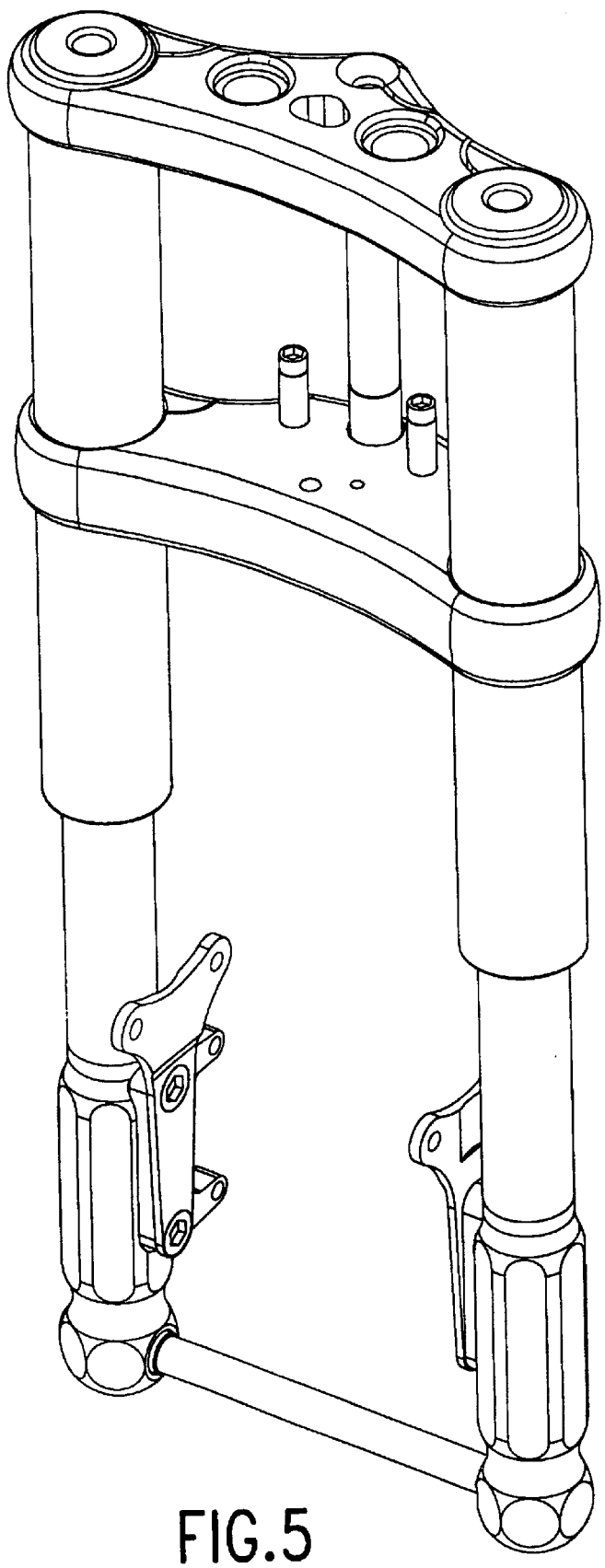
Figure 6:
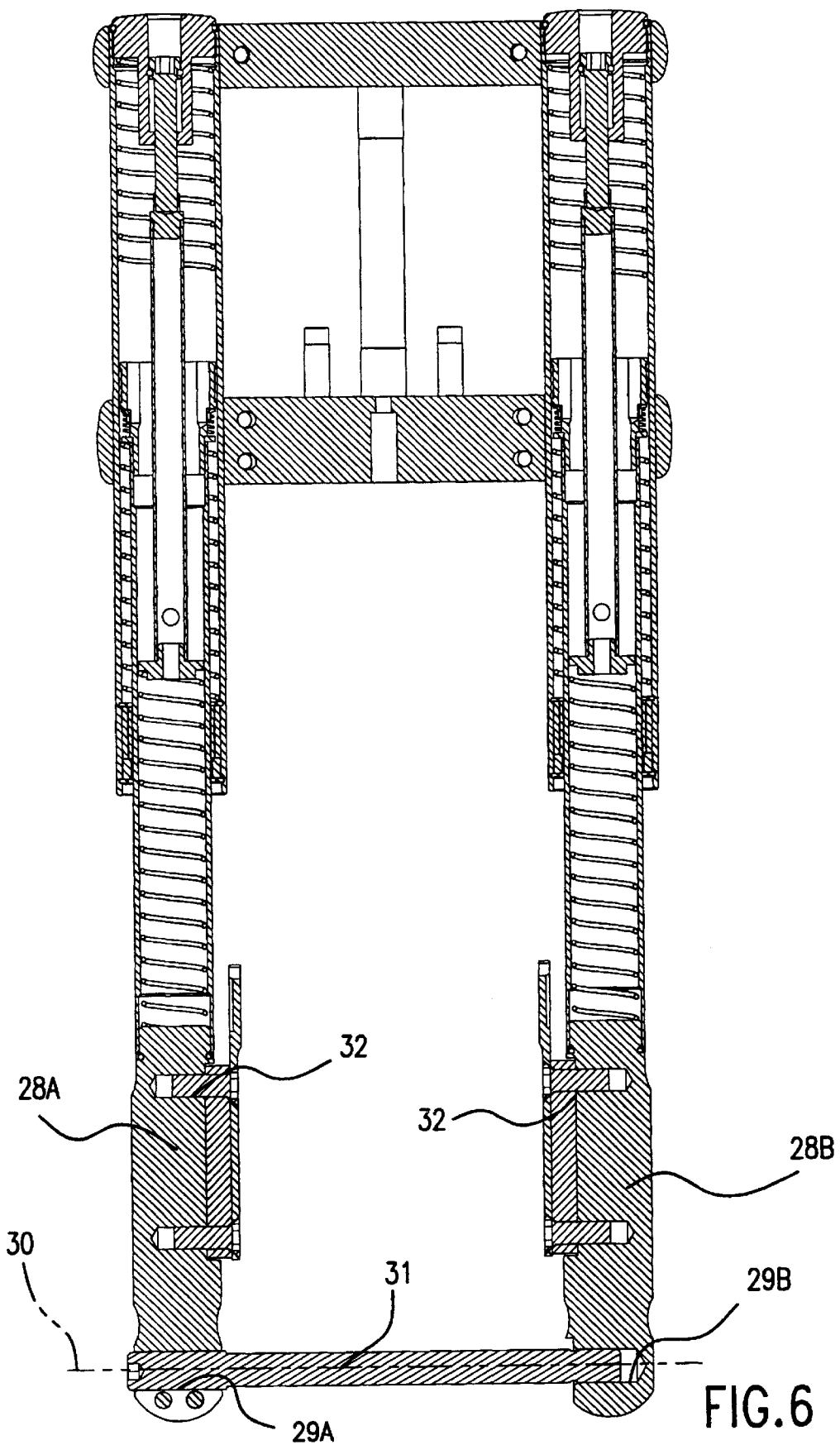
FIG. 6 is a front cross-sectional view of the fork of FIG. 3, taken along line 6—6.

FIG. 1 shows a motorcycle 10 having a frame 11 and front and rear wheels 12A and 12B, the latter carried on a suspension arm 13. A wide variety of motorcycle constructions exit. FIGS. 2–5 are front, top, side, and oblique views of a motorcycle fork assembly 20 in accordance with the invention. The fork assembly 20 includes left and right blades 21A and 21B held by upper and lower triple clamps 22A and 22B. A central stem 23 extends between the upper and lower clamps offset behind the blades. When installed on the motorcycle, the stem is pivotally carried within a head tube (not shown) of the motorcycle for rotation about a stem axis 24 for steering the motorcycle. Each blade 21A, 21B extends along a central longitudinal blade axis 25A; 25B from a lower end 26 to an upper end 27. A lower portion of the blade is formed by a leg 28A; 28B (FIG. 6) having a transverse compartment or bore 29A; 29B along an axle axis 30 for receiving a front wheel axle 31 of the motorcycle. Above the bore 29A; 29B, at least one blade is preferably provided with features 32 (FIG. 6) for mounting a disk brake caliper (the opposite blade optionally lacking such features).

Figure 7:
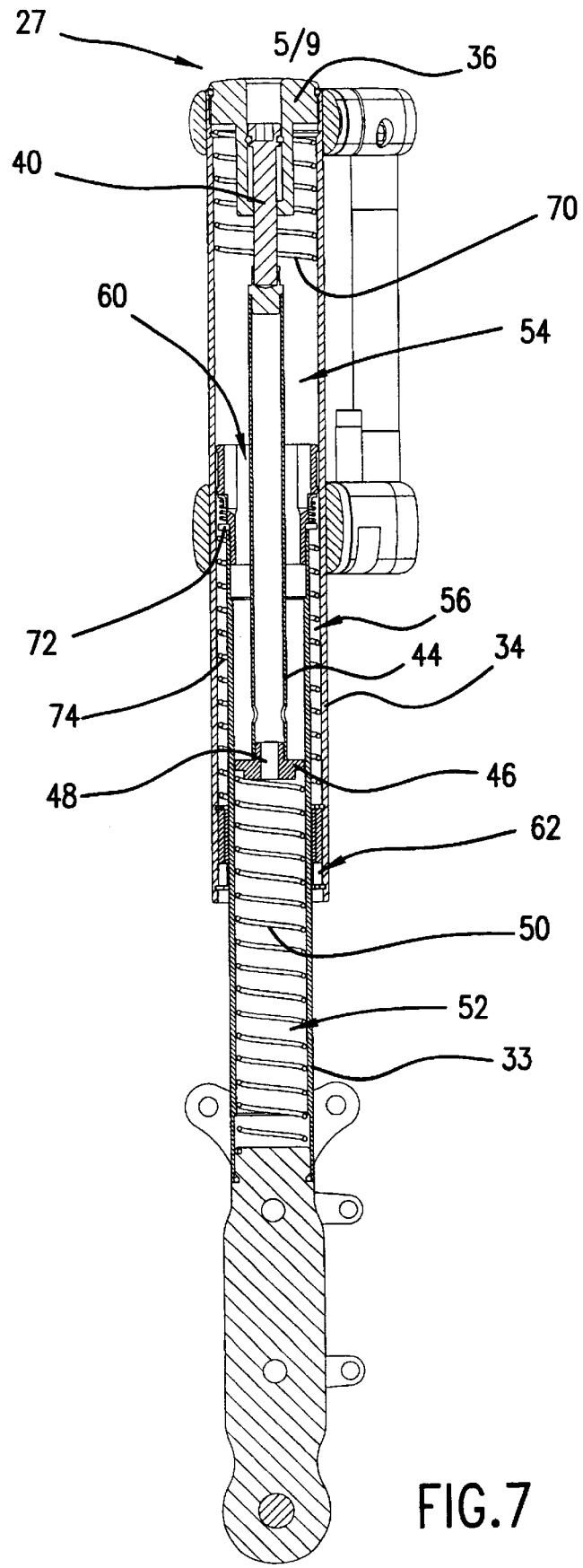
FIG. 7 is a side cross-sectional view of the fork of FIG. 2, taken along line 7—7.

Secured to the leg proximate an upper end thereof and extending thereabove along the blade axis is a first tube or slider 33 (FIG. 7). Surrounding the first tube in telescoping relation is a second tube or stanchion 34 extending upward to a plug 36 at the blade's upper end 27.

Figure 8:
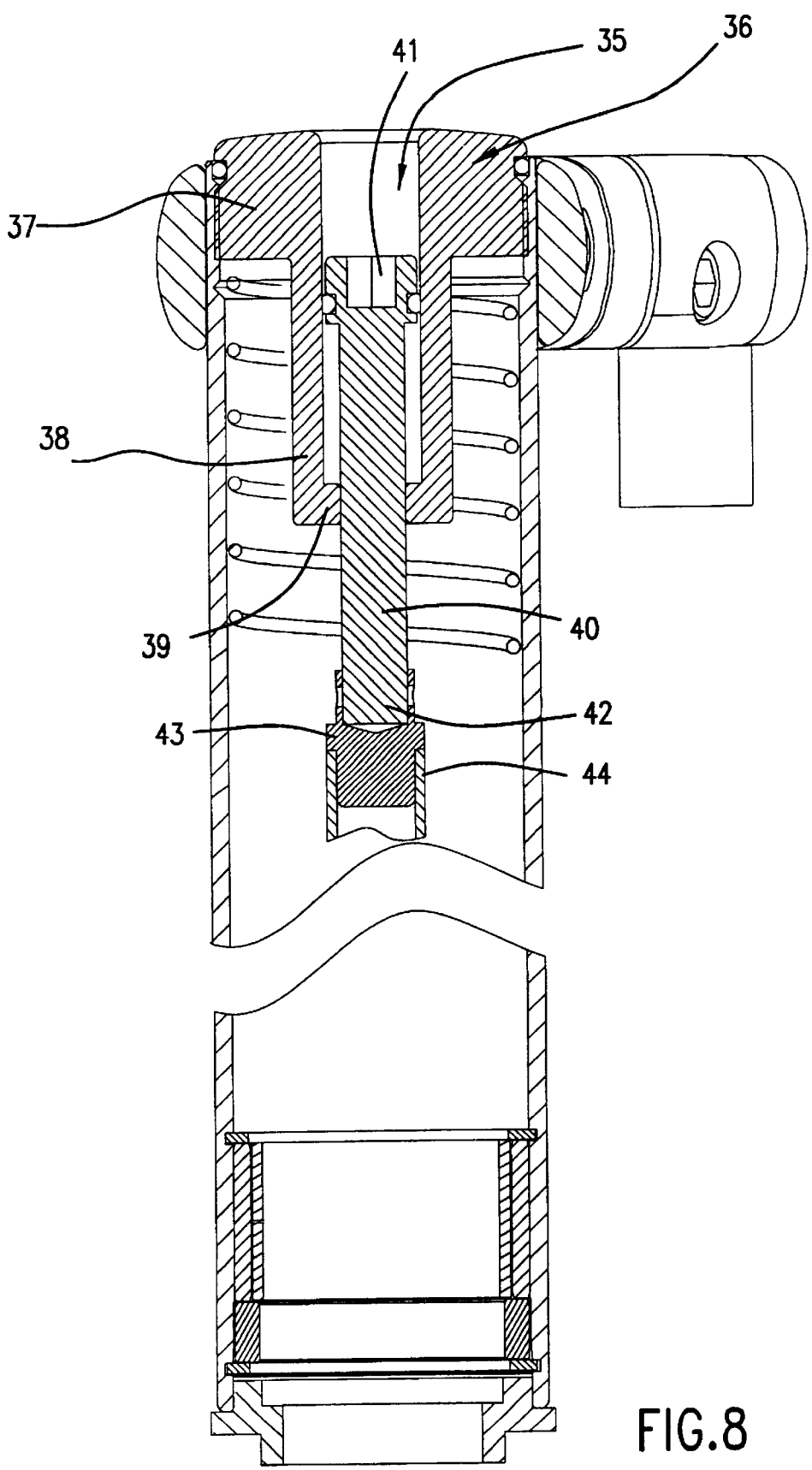
FIG. 8 is an enlarged cut-away view of a stanchion tube area of the fork of FIG. 7 with slider tube features omitted to show detail.
Figure 10:
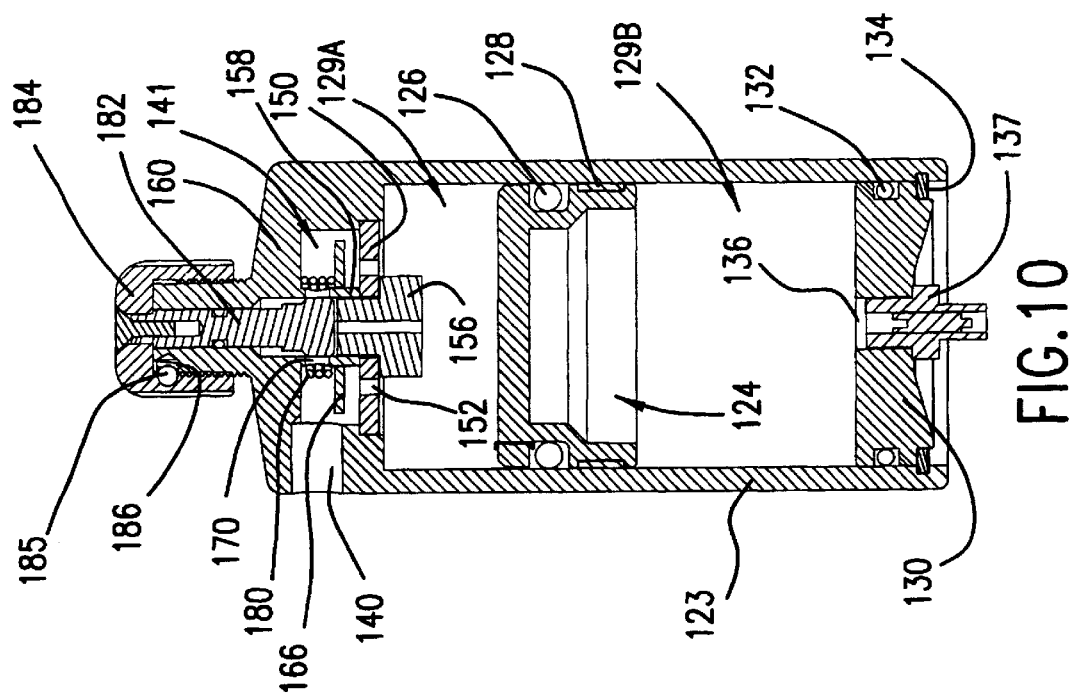
FIG. 10 is a partial longitudinal sectional view of the reservoir of FIG. 9, taken along line 10—10.
Figure 9:
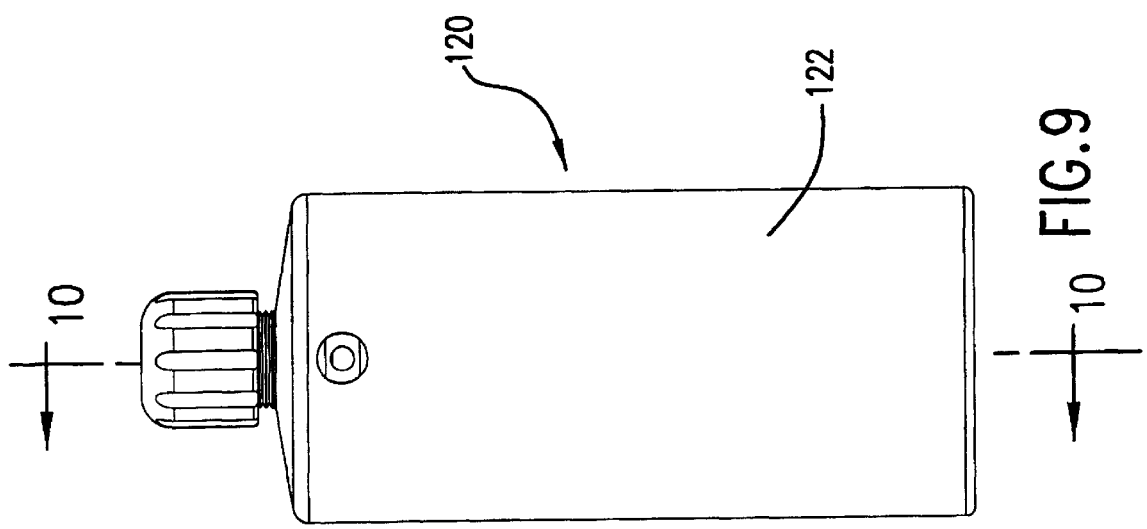
FIG. 9 is a view of a reservoir according to principles of the invention.

Centrally depending from a wide upper portion or head 37 (FIG. 8) of the plug 36 which is threaded into the stanchion 34, a tubular collar 38 bounds a central longitudinal bore or compartment 35 of the plug and has an internally threaded distal end flange 39. Extending upward into the bore and in threaded engagement with the distal end flange is a height adjustment stud 40 having an upper end or head bearing a hex socket 41 and a lower end 42 secured to the upper end of a push tube or rod 44 by an adapter 43. In the exemplary embodiment, the adapter 33 includes an upper sleeve portion surrounding the stud lower end 42 and welded thereto through apertures in such sleeve portion. The adapter further includes a lower cylindrical portion depending from a flange which separates it from the sleeve portion. The cylindrical portion is secured the upper end of the push rod 44 via welding, force fit, threaded engagement, or the like. The lower end of the push tube 44 bears a spring top piece or cover/cap 46 (FIG. 7) having a central portion extending upward into the push tube and a lower portion extending radially outward therefrom into contact or near contact with the inner surface of the slider 33. The central portion of the cover 46 is secured in the push tube lower end via welding, force fit, threaded engagement, or the like. The underside of the cover 46 has an annular shoulder for engaging a main spring 50 normally held in compression between the cover 46 and the upper end of the leg.

The blade has a normal range of motion between relatively extended and compressed fully topped-out and fully bottomed-out conditions. An exemplary normal range is about 5 inches (13 cm). Movement beyond the normal range would typically be associated with disassembly of or damage to the blade. Within a midrange of extension of the blade, the main spring 50 bears substantially the entire static load or longitudinal compression force applied to the blade. Preferably throughout the entire normal range of motion, but at least throughout a primary midrange portion (e.g. about 3–4 inches (8–10 cm)) thereof in which the blade reciprocates under typical riding conditions, the cover 46 (or at least a lower spring-engaging portion thereof) remains within the slider 33 so that the main spring 50 remains entirely within the slider. This avoids potential problems associated with the main spring encountering telescoping surfaces and, potentially, being caught on such surfaces (e.g., contacting the telescoping end of the inner of two telescoping tubes) to cause binding. The construction is also compatible with the height adjustment feature described below.

The cover 46 includes a central longitudinal passage or aperture 48 which allows fluid communication between the interior of the push tube 44 and a first space 52 defined by that portion of the interior of the slider 33 below the cover 46. Apertures in the push tube 44 permit communication between its interior and a second space 54 largely defined by an interior of the slider 33 above the cap and an interior of the stanchion 34 within and above an annular piston 60 secured to the upper end of the slider. Details of an exemplary piston 60 are disclosed in the first numbered embodiment in co-pending provisional patent application Ser. No. 60/112,838 entitled "Motorcycle Suspension". The piston 60 provides fluid valving between the second space 54 identified above and a third space 56 formed by the annular space radially between the tubes 33 and 34 and longitudinally between the piston 60 and a bearing/bushing/seal assembly 62 held within the tube 34 near its lower end. Details of other components such as seals, retainers, and the construction of the piston 60 may be as identified in the first embodiment of the Ser. No. 60/112,838 application. The primary compression valving is provided by the piston 60 between the second and third spaces identified above with some additional flow resistance being presented by the aperture 48 within the cover 46. In a bottoming-out portion of the normal range of travel (extending to the fully bottomed-out position at the compressed extreme of the blade's range of travel) the piston 60 engages a bottom-out spring 70 to compress the bottom-out spring between the piston 60 and the underside of the head of the plug 36 to increase resistance to compression above that provided by the main spring 50 alone. In a topping-out portion of the normal range of travel (extending to the fully topped-out position at the extended extreme of the blade's range of travel) a flange or spring stop 72 secured between the piston 60 and the upper end of the tube 32 engages a top-out spring 74 to compress the top-out spring between the spring stop and the bushing 62 to resist further extension of the blade against any force from the main spring and from inertia. In the exemplary embodiment, the bottoming-out portion is about 1 inch (2.5 cm) while the topping-out portion includes the entire normal range of motion. This topping-out portion is facilitated by providing the top-out spring 74 with a much lower spring constant than the main spring 50. Much shorter top-out ranges (e.g. 1 inch (2.5 cm)) are possible.

Static height adjustment of the blade is achieved by placing a hex key (not shown) into the central compartment 35 of the plug 36 and engaging the hex socket of the stud 40 to rotate the stud 40 to either raise or lower the stud within the compartment. This correspondingly raises or lowers the tube 44 and cover 46 to respectively lower or raise the static position of the stanchion 34 relative to the slider 33 and thus lower or raise the front end of the motorcycle. Advantageously the threaded portion of the stud has a length of about 2 inches (5 cm) to provide a nearly coextensive range of height adjustment. Within an exemplary 5 inch (13 cm) normal range of motion, an exemplary initial static position is 2 inches (5 cm) from the fully topped-out condition. The stud 40 may initially be at its highest position (e.g. with its hex socket just flush or slightly subflush to the upper surface of the plug 36). Lowering of the stud via rotation would raise the static position. If a large static load is placed upon the motorcycle or if the main spring sags over time, the static position would drop and the stud may be moved from its highest position sufficiently to restore the static height to a desired value.

The foregoing construction can provide a height adjustable front fork which is convenient to manufacture, has a valve providing a large blow-off area and corresponding large flow rate under compression and which is resistant to binding so as to provide smooth operation throughout its range of motion.

FIGS. 9–14 show details of a reservoir 120 for an adjustable air shock absorber such as may be featured on the rear suspension of a motorcycle. A reservoir body 122 is preferably unitarily formed as a single shot impact extrusion of an aluminum alloy. Within a main bore of the body encircled by a sidewall portion 123 (FIG. 10), there is an internal floating piston 124 carrying an elastomeric piston O-ring 126 and a PTFE/brass bushing 128 in outwardly facing annular pockets. The piston 124 separates the bore into proximal and distal spaces or volumes 129A and 129B. The distal end of the reservoir body is sealed by a fixed endcap 130 bearing an elastomeric endcap O-ring 132 and secured in place by a retainer ring 134. Optionally, the piston 124 may be replaced by a bladder or the like and the endcap 130 may be formed as a plug (as shown) or as a cover.

The endcap 130 has an internally threaded bore 136 into which a Schrader valve 137 is mounted to permit selective air pressurization of the distal space 129B. The proximal space 129A is normally filled with hydraulic fluid and is communication with the shock absorber (not shown) via a hydraulic line (not shown) threaded into a transverse aperture or port 140. This can permit mounting of the reservoir remote from the shock absorber. The port 140 is in communication with an annular space 141 separated from the space 129A by an apertured valve plate 150 having rebound flow orifices 152 and a central orifice through which an apertured bolt 156 extends to threadingly engage a nipple or sleeve 158 depending from an upper web 160 of the body 122. A valve plate or washer 166 normally blocks the orifices 152. When the shock absorber is under compression, fluid flows through the port 140 into the annular space 141 and therefrom through lateral apertures 170 in the sleeve 158 and downward through the central aperture in the bolt 156 to the space 129A causing a downward movement of the piston 124 compressing the air in the space 129B. Under compression, the washer 166 contacts the plate 150 to seal the orifices 152. Under rebound (extension), there is a reverse of such flow combined with flow through the orifices 152 as the pressure difference between the spaces 129A and 141 moves the washer 166 out of engagement with the plate 150 compressing a spring 180.

Low speed compression damping is typically associated with motion of the unsprung motorcycle mass. Exemplary low speed oscillations are in the range of 2 Hz+/−1 Hz. High speed compression damping is typically associated with the unsprung mass and involves typical frequencies of 10 Hz+/−5 Hz. To provide adjustment for low speed compression resistance, a needle 182 is threadingly engaged to the body 122 proximate the base or proximal end of the sleeve 158. At the upper end of the needle, an adjustment knob 184 is screwed in place and is rotatable by user to rotate the needle 182 and thereby raise and lower the needle. Raising and lowering of the needle varies the degree to which the lower end of the needle blocks flow through the apertures 170 (i.e., the percentage of cross-sectional flow area blocked by the needle, from zero to total) and, thereby, regulates the compression stiffness of the shock absorber. A detent mechanism may include a spring loaded ball 185 in a compartment 186 of a neck portion of the body 122 to allow the knob 184 to be rotated in discrete increments and maintain its position until further adjusted by the user.

The exemplary embodiment 120 provides a reservoir assembly which is convenient to manufacture allowing the body 122 to be formed of a single impact extrusion with minor additional machining such as for the port 140, aperture 170, compartment 186, pocket for the ring 134, and the various threaded areas. Such a manufacture also provides a clean appearance as distinguished from multi-component reservoir bodies. Such a reservoir may be advantageously utilized with a variety of shock absorber constructions and in non-motorcycle applications such as automobiles and bicycles.

Figures 15, 16:
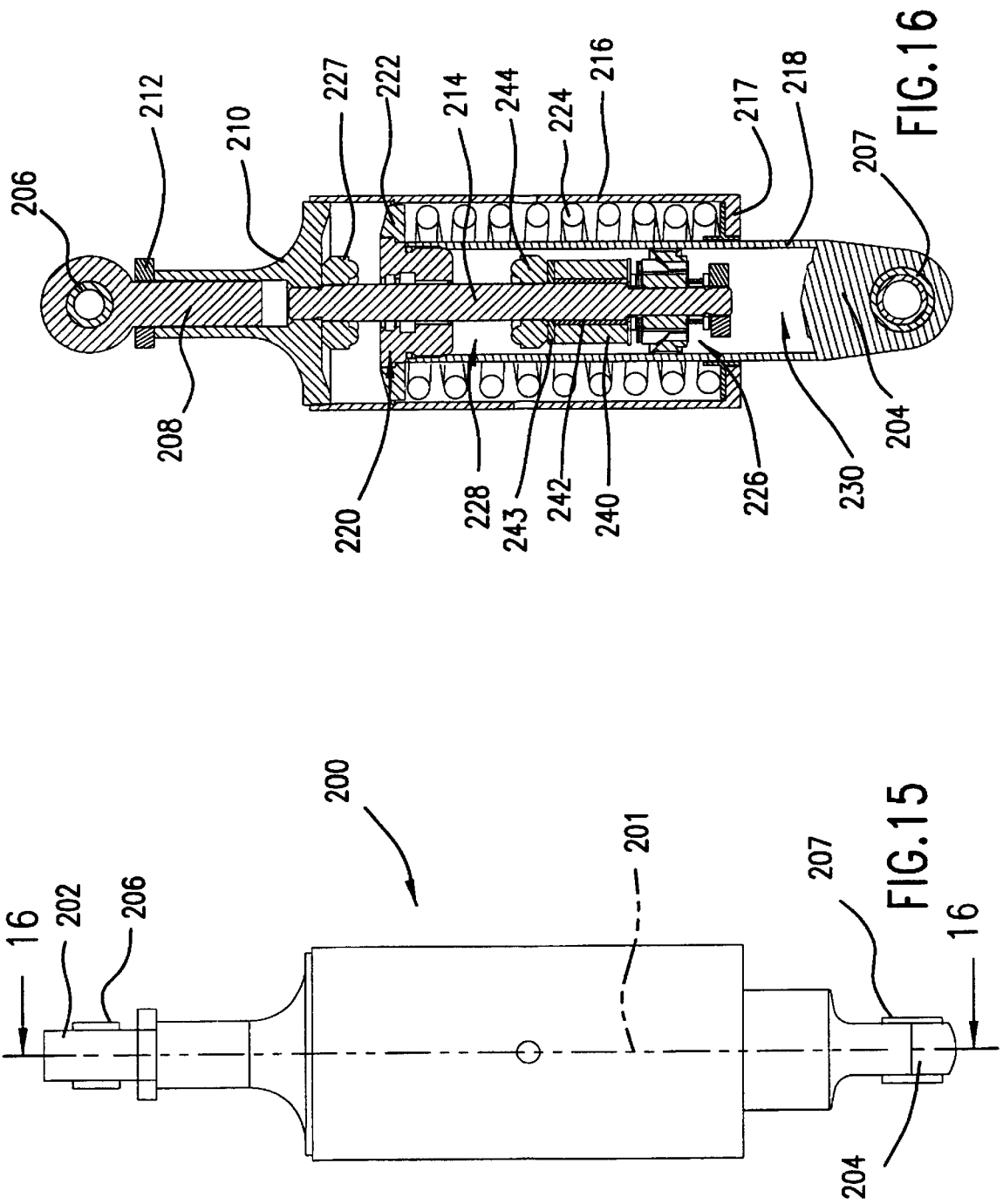
FIG. 15 is a view of a motorcycle rear shock absorber.
FIG. 16 is a longitudinal cross-sectional view of the shock absorber of FIG. 15 taken along line 16—16.

FIG. 15 shows a shock absorber 200 extending along an axis 201 from an upper clevis rod end 202 to a lower eyelet 204. The clevis rod and lower eyelet each define apertures carrying associated elastomeric spacer 206 and elastomeric bushing 207 for respectively securing the shock absorber to the frame and the rear suspension arm of the motorcycle. Depending from the clevis rod end 202, a threaded clevis rod shaft 208 is engaged to an internally threaded bore of a shaft adapter 210 and locked in place via a clevis nut 212 tightened into engagement with a rim at the upper end of the adapter. The clevis nut may be backed off and the clevis rod rotated about the axis 201 relative to the adapter 210 and the nut then retightened to provide a static length adjustment for the shock absorber and thereby a static height adjustment for the rear suspension. Depending from the adapter 210 are a central piston shaft 214 and an external housing tube 216. Concentrically within the housing tube 216 and extending through an aperture in a web 217 at a lower end of the housing, an inner tube 218 extends upward from the lower eyelet 204. The upper end of the inner tube 218 carries an assembly 220 surrounding the shaft 224 and acting both as bearing to permit relative longitudinal movement of the shaft and inner tube while maintaining them co-axial and as a seal to prevent escape of hydraulic fluid within the interior of the inner tube 218.

The assembly 220 also includes a flange 222 extending outward toward an interior surface of the housing tube 216 and having an underside engaged to an upper portion of a main spring 224 to compress the main spring between such underside and an upper surface the housing tube flange 217 to resist extension of the shock absorber. At its lower end, the shaft 214 carries a piston assembly 226. Near its upper end, the shaft 214 carries an elastomeric bottom-out bumper 227. The piston assembly seals with the internal surface of the inner tube 218 and divides the internal volume of the inner tube into an upper or extension portion 228 and a lower or compression portion 230. The piston assembly defines appropriate apertures and valving mechanisms to permit flow of hydraulic fluid between the extension and compression portions as the shock absorber is extended and compressed so as to provide appropriate damping. A wide variety of piston assembly structures may be utilized.

As the shock absorber is compressed, the combined free volume of the extension and compression portions is decreased by the volume of shaft 214 introduced into the interior of the inner tube 218 by the compression movement. During an extension movement the combined volume is increased by the volume of shaft which exits the interior. Since the hydraulic fluid is essentially incompressible, a volume compensation is provided. This may be done by mixing a gas with the fluid or by providing a reservoir. In the shock absorber 200, compensation is provided in the form of an annular gas-filled bladder member 240 located on the extension side of the shock absorber within the extension volume 228. In the exemplary embodiment the bladder member 240 is formed of an annular cylinder of closed cell microcellular urethane foam. Exemplary material is available from Rogers Corporation of Rogers, Connecticut. Upon compression, the gas within the cells is compressed so as to maintain the required free volume for the hydraulic fluid. Upon extension, the gas expands. The presence of the bladder member 240 provides a relatively light extension stroke. Specifically, the piston assembly permits sufficient fluid flow from the extension volume to the compression volume so that the pressure within the extension volume decreases, causing the bladder member to expand, which in turn relieves the pressure decrease and thus the resistance to extension. In the absence of compensation provided by the bladder member, there would be greater resistance to the extension caused by the pressure decrease.

To avoid damage to the bladder member 240 upon topping out, a sleeve 242 extends within the bladder member and at its upper end supports a washer 243 which in turn supports an elastomeric top-out bumper 244. Upon topping out the sleeve 242 transfers compression load from the piston to the bumper and in turn to the assembly 220, sparing the bladder member 240 all or much of this compressive load which might otherwise be sufficient to rupture the cells.

Exemplary material for the clevis rod and the shaft is steel. Exemplary material for the eyelet/inner tube, shaft adapter, and housing tube is aluminum.

One or more embodiments of the present invention have been described. Nevertheless, it will be understood that various modifications may be made without departing from the spirit and scope of the invention. For example, modifications may be made to accommodate the environment of existing motorcycle or suspension elements to which the principles of the invention are being applied. Accordingly, other embodiments are within the scope of the following claims.

What is claimed is:

1. A fork blade comprising:
   a leg for engaging a front wheel axle;
   a lower tube extending upward from the leg along a central blade axis;
   an upper tube telescopically surrounding and coaxial with the lower tube and coupled to a steering tube;
   an upper endplug, extending with an upper end of the upper tube;
   an elongate pushrod member depending from the endplug;
   a first, main spring, longitudinally captured between said leg and said pushrod;
   an annular piston secured proximate an upper end of the lower tube and having at least one valve element for regulating fluid flow between: (a) an annular space separating the lower tube from the upper tube; and (b) a space within the upper tube above the lower tube and extending within the lower tube; and
   a second, top out spring, surrounds the upper portion of the lower tube and is compressible between the annular piston and a stop member secured within the lower portion of the upper tube.

2. The fork blade of claim 1 further comprising:
   a third, bottom-out spring, said bottom-out spring is compressible between the endplug and the annular piston secured proximate the upper end of the lower tube, said bottom-out spring being activated primarily during the last portion of suspension travel in the bottoming-out portion of said range of travel.

3. The fork blade of claim 1 whereby:
   the elongate pushrod member is tubular and is connected to the endplug through an adjuster mechanism for adjusting the longitudinal separation between the main spring and the endplug.

4. The fork blade of claims 3 hereby:
   the adjuster mechanism is formed in the endplug, the endplug comprises:
      a head;
      a sleeve depending from the head;
      and a web spanning the sleeve and having a threaded central aperture;
   the adjuster mechanism also comprising:
      a stud extending through the central aperture and comprising:
         an externally threaded portion engaged to the threaded central aperture;
         a stud head, above the external threaded portion,
         the stud head has a hexagonal socket for engagement by a hex-key
         wrench to allow the user to engage the stud head;
      when the stud head is rotated, the position of the elongate pushrod member relative to the endplug is altered along the central axis so as to adjust the longitudinal separation between the pushrod member and the endplug.

* * * * *